United States Patent Office 3,054,685
Patented Sept. 18, 1962

3,054,685
FLUORMICA-FLUORAMPHIBOLE CERAMICS AND
PROCESSES OF MAKING SAME
Haskiel R. Shell, Norris, Tenn., assignor to the United
States of America as represented by the Secretary of
the Interior
No Drawing. Filed Feb. 9, 1960, Ser. No. 7,732
9 Claims. (Cl. 106—39)
(Granted under Title 35, U.S. Code (1952), sec. 266)

The invention herein described and claimed may be manufactured and used by or for the Government of the United States of America for governmental purposes without the payment of royalties thereon or therefor.

This invention relates to ceramic compositions and articles comprising a mixture of fluormica and fluoramphibole, and to methods of producing them.

Synethetic fluormicas are readily hot-pressed to yield a commercially useful material which is machinable and has excellent dielectric properties. It is therefore very useful for applications which demand a relatively soft machinable dielectric. However, for some desired applications, such as in ceramic brake blocks and radomes for aircraft, the fluormicas are too soft and are too easily abraded. Most materials which would ordinarily be desirable additives for the purpose of increasing strength and abrasion resistance, react with the fluormica under the conditions of hot-pressing to yield undesirable secondary products. It was discovered that the fluoramphiboles are compatible with the fluormicas under the drastic conditions of hot-pressing, and that the machinability and abrasion resistance of the product could be controlled by varying the ratio of fluoramphibole to fluormicas.

Articles made from these compositions retain to a considerable degree the properties of each component constituent, resulting in strong, abrasion-resistant ceramics which are machinable. By a judicious selection of the fluoramphibole to fluormica ratio a product may be made having the qualities desired. Since both fluoramphiboles and fluormicas exhibit extensive isomorphism, it is readily apparent that the choice of materials to yield specific properties is very large. Because they are synthetic, the products of this invention may be made from raw materials of any desired or economic purity.

The products of this invention are useful in applications where increased strength and abrasion resistance are necessary, as in radomes, ceramic brake blocks, grinding wheels, and other uses of a similar nature.

It is an object of this invention to provide a combination of matter comprising fluoramphibole and fluormica having superior properties.

Another object of this invention is to provide a method for the preparation of the fluoramphibole-fluormica composition.

It is a further object of this invention to provide ceramic articles of manufacture of superior properties from a composition of matter comprising fluoramphibole and fluormica.

Further objects will become apparent from the following description of the invention.

The amphiboles are a group of chemically and structurally related inorganic crystalline compounds having the general formula $$W_{0-1} \cdot V_2 \cdot U_5 \cdot (T_4O_{11})_2 \cdot (OH, F)_2$$
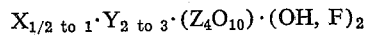

crystallizing as double chain silicates. W refers to univalent cations in 12 fold coordination with oxygen, and may be vacant or occupied by $Na^+$ or $Li^+$. V refers to univalent or divalent cations in 8 fold coordinations with oxygen, and is usually occupied by $Na^+$ and/or $Ca^{++}$, but may be completely or partially $Mn^{++}$, $Mg^{++}$, $Cd^{++}$, or $Sr^{++}$. U refers to di- or trivalent cations in 6
fold coordination with oxygen, or with oxygen and fluoride, and is usually $Mg^{++}$, but may be partially replaced by $Al^{+++}$, $Co^{++}$, $Cu^{++}$, $Fe^{++}$, $Fe^{+++}$, $Li^+$, $Mn^{++}$, or $Ni^{++}$. T refers to small and/or highly charged cations in 4 fold coordination with oxygen, and is usually $Si^{++++}$, but may partially be replaced by $Al^{+++}$, or $B^{+++}$.

Mica is a family of chemically and structurally related inorganic crystalline compounds having the general formula $$X_{1/2 \text{ to } 1} \cdot Y_{2 \text{ to } 3} \cdot (Z_4O_{10}) \cdot (OH, F)_2$$

and crystallizing as layer silicates. X refers to relatively large uni- or divalent cations in 12 fold coordination with oxygen, and is usually $K^+$, but may be $Na^+$, $Rb^+$, $Cs^+$, $Tl^+$, $Ca^{++}$, $Sr^{++}$, $Ba^{++}$, or $Pb^{++}$. Y refers to smaller cations in 6 fold coordination with oxygen, or with oxygen and fluorine, and in synthetic micas is usually $Mg^{++}$, which may be completely replaced by $Fe^{++}$, $Co^{++}$, or $Ni^{++}$, or partially by $Mn^{++}$, $Li^+$, $Ti^{++}$, $Zn^{++}$ or $Cu^{++}$. Z refers to small and/or highly charged cations in 4 fold coordination with oxygen and is usually the ratio 3 $Si^{++++}$ plus 1 $Al^{+++}$, but may in some types of micas be all $Si^{++++}$. In some type of fluor-phlogopite mica the silicon can be replaced completely with $Ge^{++++}$. Additionally, the $Al^{+++}$ may be replaced by $B^{+++}$, $Fe^{+++}$, $Mn^{+++}$, $V^{+++}$, $Cr^{+++}$, or $Ge^{+++}$.

In both amphiboles and micas O refers to the doubly charged oxygen anion $O^=$, $OH^-$ to the hydroxyl anion commonly present in most natural amphiboles and micas, and $F^-$, to the fluoride anion which completely replaced $OH^-$ in the synthetic fluoramphiboles and fluormicas.

The synthetic fluoramphiboles and the fluormicas employed in this invention are prepared separately by reaction in the solid state at a suitable temperature to yield products having a microcrystalline structure. Reaction of the raw materials together was found to be unfavorable because of the preferential formation of mica under such conditions. The two products, formed separately, are mixed intimately and pressed at a suitable temperature and time. In view of the many substitutions possible in both amphiboles and micas, the optimum reaction conditions of time and temperature for each particular combination must be determined experimentally in each case.

The temperature of hot-pressing can range from a minimum equal to that temperature at which reactivity becomes appreciable, to a maximum which is just below the melting point of the highest melting constituent. This range covers from about 800° C. to about 1500° C., varying according to the composition employed. Time of the hot-pressing step varies from a minimum of about one minute or less to a maximum of around 5 hours or even more. The pressure employed varies from a minimum resulting in a satisfactory product under a given temperature and time to a maximum of 10,000 p.s.i. or even more. In general, the limiting upper pressure depends on the materials of construction employed. With a graphite die the pressure range is usually from about 1000 p.s.i. to about 2000 p.s.i., but this may go up to and beyond 10,000 p.s.i. with suitable structural materials.

The usual range employed with a graphite die is a temperature of 1000° C. to 1200° C., a pressure of 1000 p.s.i. to 1500 p.s.i., and 15 to 60 minutes' pressing time. Since the factors of time, temperature and pressure are all interdependent, by increasing the temperature the pressure and/or time may be reduced, and similarly, for each of the other factors.

When formed separately, then mixed together so as to have a substantial amount of each component present, fluoramphiboles and fluormica yield products retaining to a considerable degree the properties of each. By substantial amount is included quantities above accidental or minor amounts of one phase formed during synthesis of the other, and represents an amount large enough to result in products having the desired properties. A quantity in the neighborhood of about 20 to 25% by weight is exemplary of the lower ranges contemplated.

They do not react chemically to form new compounds as is true of most additives to synthetic mica, instead each is retained as a separate distinct phase. The fluoramphibole imparts increased abrasion resistance, strength, and hardness, while the fluormica imparts machinability to the product, which is chemically resistant and an excellent dielectric.

These fluorine-containing synthetic minerals are prepared by reacting under suitable conditions predetermined amounts of ingredients supplying the required elements. The presence of fluoride is indispensable in providing the reactivity in the solid state and in providing $F^-$ anion which is a necessary part of the crystal structure of both the fluoramphiboles and the fluormicas. An excess of fluoride may be desirable for some compositions or uses, to increase speed of reaction, or to improve strength of product. Up to three times the amount of fluoride normally required may be used. Without fluoride, no micas or amphiboles are formed; the only products are pyroxenes or orthosilicates. Fluorine in the structure also gives the product heat stability which is distinctly superior to natural amphiboles and micas containing the hydroxy radical. The naturally occurring micas and amphiboles cannot be used to produce the products of this invention.

This invention is further illustrated by the following example:

EXAMPLE

A microcrystalline fluormica having the formula $$K_2 \cdot Mg_6 \cdot Al_2Si_6 : O_{20}F_4$$

was prepared by reacting in the solid state, at 980° C. for 16 hours, the following well-mixed materials: 341 grams $K_2SiF_6$, 72 grams $K_2CO_3$, 724 grams $Mg(OH)_2$, 459 grams dehydrated kaolin and 403 grams ground silica sand.

A fluoramphibole of the formula $$Na \cdot NaCa \cdot Mg_5 \cdot Si_8 : O_{22}F_2$$

was prepared by reacting in the solid state, at 980° C. for 17 hours, the following well-mixed materials: 212 grams $Na_2SiF_6$, 119 grams $Na_2CO_3$, 225 grams $CaCO_3$, 657 grams $Mg(OH)_2$, and 1014 grams finely ground silica sand to produce a mass comprised of microcrystals. Copending application to Haskiel R. Shell, Serial No. 739,947, filed June 4, 1958, now U.S. 2,948,629, discloses additional examples of fluoramphiboles which may be employed.

Finely divided mixtures of the above fluormica and fluoramphibole in the ratio by weight of 3:1, 2:1, 1:1, 1:2, and 1:3, respectively, were hot-pressed for one hour at temperatures from 1000° C. to 1100° C. and 1000 p.s.i. pressure. Abrasion resistance, transverse strength, and impact resistance increased with increasing fluoramphibole content, as shown in table, yet machinability was retained in samples having up to two-thirds and three-fourths fluoramphibole. X-ray examination showed that each phase retain its identity in the final product and did not react to form secondary compounds. Instead, each bonded to the other to form a microcrystalline structure to which each phase contributed its own unique properties. Abrasion resistance was directly related to the fluoramphibole content, since it has a hardness similar to quartz, while the micas are relatively soft. The following table lists the properties of these fluoramphibole-fluormica mixtures.

Table.—*Properties of Fluoramphibole—Fluormica Hot-pressed Mixtures, 1 Hour at 1000 p.s.i.*

| No. | Composition (Percent by Weight) | | Density | Machinability | Temperature of hot-pressing, °C. | Apparent porosity, Percent | Modulus of rupture, p.s.i. | Dielectric constant | Power Factor (1 meg.) | Loss Factor | Impact Strength Charpy, lbs. |
|---|---|---|---|---|---|---|---|---|---|---|---|
| | Fluoramphibole, Percent | Fluormica, Percent | | | | | | | | | |
| 1 | 100 | 0 | 2.94 | not mach. | 1,030 | .1 | 21,200 | 6.5 | .001 | .007 | 210 |
| 2 | 75 | 25 | 2.88 | fair | 1,040 | .1 | 12,300 | 7.1 | .003 | .022 | 170 |
| 3 | 67 | 33 | 2.85 | do | 1,050 | .17 | 13,600 | 7.0 | .002 | .014 | 140 |
| 4 | 50 | 50 | 2.84 | good | 1,060 | .17 | 16,300 | 6.6 | .003 | .020 | 114 |
| 5 | 33 | 67 | 2.83 | excellent | 1,080 | .18 | 11,800 | 6.4 | .003 | .020 | 92 |
| 6 | 25 | 75 | 2.73 | do | 1,100 | .05 | 10,800 | 6.2 | .002 | .012 | 78 |
| 7 | 0 | 100 | 2.80 | do | 1,250 | .5 | 9,000 | 6.2 | .003 | .016 | 55 |

Although I have described in some detail several preferred embodiments of my invention, many modifications may be made therein without departing from the scope of the invention, as it is defined by the following claims.

This case is a continuation-in-part of application Serial No. 775,086, filed November 19, 1958, now abandoned.

I claim:

1. An improved shape ceramic article of manufacture consisting essentially of a mixture of (1) particles of fluormica of the formula $$X_{1/2 \text{ to } 1} \cdot Y_{2 \text{ to } 3} \cdot (Z_4O_{10}) \cdot F_2$$

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with at least one cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with at least one cation selected from $Al^{+++}$, $Be^{+++}$, $B^{+++}$, $Fe^{+++}$, $Mn^{+++}$, $V^{+++}$, and $Cr^{+++}$, and (2), microcrystals of fluoramphibole of the formula $$W_{0-1} \cdot V_2 \cdot U_5 \cdot (T_4O_{11})_2 \cdot F_2$$

wherein W is selected from the group consisting of $Na^+$ and $Li^+$ and mixtures thereof, V is selected from the group consisting of $Na^+$, $Ca^{++}$, $Mn^{++}$, $Mg^{++}$, $Cd^{++}$ and $Sr^{++}$ and mixtures thereof, U is selected from the group consisting of $Mg^{++}$ and mixtures of $Mg^{++}$ with at least one member of the group consisting of $Al^{+++}$, $Ca^{++}$, $Fe^{++}$, $Fe^{+++}$, $Li^+$, $Mn^{++}$, and $Ni^{++}$, T is selected from the group consisting of $Si^{++++}$ and a combination of $Si^{++++}$ with at least one member of the group consisting of $Al^{+++}$ and $B^{+++}$, said fluormica and fluoramphibole being present in substantial quantities in the mixture and bonded together to form a unitary mass.

2. An improved shaped ceramic article of manufacture consisting essentially of a mixture of (1) particles of fluormica of the formula $K_2Mg_6Al_2Si_6O_{20}F_2$ with (2) microcrystals of fluoramphibole of the formula $$Na \cdot NaCa \cdot Mg_5 \cdot Si_8O_{23} \cdot F_2$$

said fluormica and fluoramphibole being present in substantial quantities in the mixture and bonded together to form a unitary mass.

3. An improved ceramic article of manufacture as in claim 2, wherein the ratio of the fluormica to the fluoramphibole is in the range of from 3:1 to 1:3 by weight.

4. A method for preparing improved ceramic articles of manufacture which comprises the steps of (1) forming a mixture consisting essentially of fluormica and fluoramphibole by mixing comminuted fluormica of the formula $X_{1/2 \text{ to } 1} \cdot Y_{2 \text{ to } 3} \cdot (Z_4O_{10}) \cdot F_2$ with a substantial amount of microcrystals of fluoramphibole of the formula $W_{0-1} \cdot V_2 \cdot U_5 \cdot (T_4O_{11}) \cdot F_2$, the value of U, V, W, X, Y and Z being as in claim 1, and (2) hot-pressing the mixture under a pressure of from about 1000 p.s.i. to about 10,000 p.s.i., a temperature of from about 800° C. to about 1500° C., and for a time of from about 1 minute to about 5 hours, whereby the fluormica and fluoramphibole become bonded together to form a unitary mass.

5. A method for preparing an improved ceramic article of manufacture as in claim 4, wherein the fluormica has the formula $K_2Mg_6Al_2Si_6O_{20}F_2$ and the fluoramphibole has the formula $Na \cdot NaCa \cdot Mg_5 \cdot Si_8O_{22}F_2$.

6. A method for preparing an improved ceramic article of manufacture as in claim 5, wherein the ratio of fluormica to fluoramphibole is in the range of 3:1 to 1:3 by weight.

7. A method for preparing an improved ceramic article of manufacture as in claim 5, wherein the hot-pressing step is conducted at a pressure within the range of about 1000 p.s.i. to about 1500 p.s.i., a temperature within the range of about 1000° C. to about 1200° C., and for a time of from about 15 to about 60 minutes.

8. A method for preparing an improved ceramic article of manufacture as in claim 5, wherein the ratio of fluormica to fluoramphibole is in the range of 3:1 to 1:3 by weight, and the hot-pressing step is conducted at a pressure of about 1000 p.s.i. to about 1500 p.s.i., a temperature within the range of about 1000° C. to about 1200° C., and for a time of about 15 to about 60 minutes.

9. A method for preparing an improved ceramic article of manufacture as in claim 8, wherein the hot-pressing step is conducted at a pressure of about 1000 p.s.i. at a temperature of about 1000° C. to about 1100° C. for a time of about 1 hour.

References Cited in the file of this patent

UNITED STATES PATENTS

| | | |
|---|---|---|
| 1,795,200 | Crossley | Mar. 3, 1931 |
| 2,675,853 | Hatch et al. | Apr. 20, 1954 |
| 2,948,629 | Shell | Aug. 9, 1960 |

OTHER REFERENCES

Comeforo et al.: Amer. Mineralogist, volume 39 (1954) "Synthetic Asbestos Investigations" (pp. 537–41).